June 3, 1930.
W. F. RICHARDS
COUPLER
Re. 17,690
Original Filed Feb. 2, 1927 4 Sheets-Sheet 1
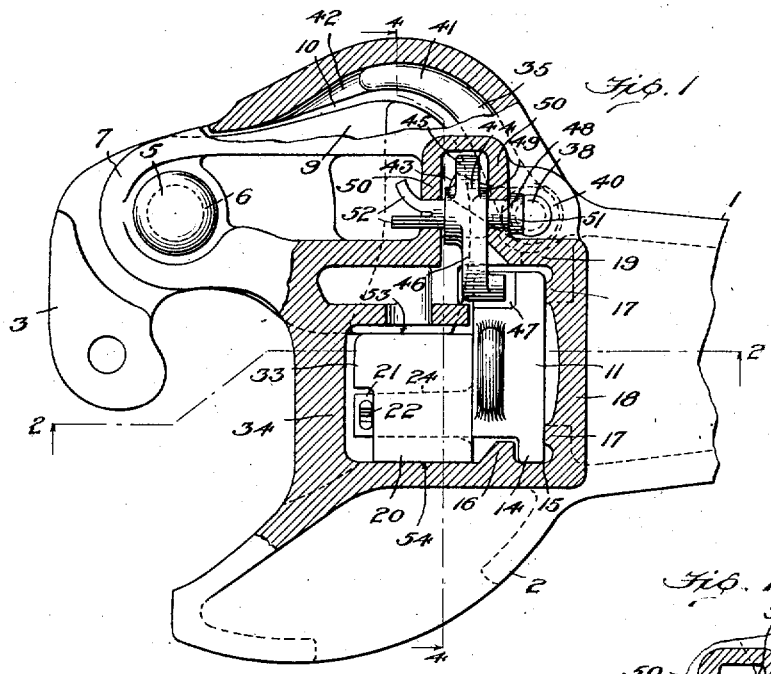
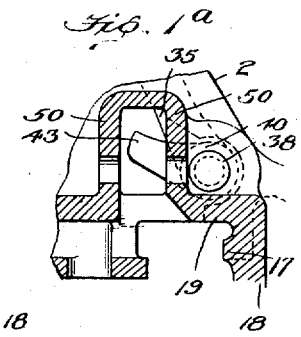
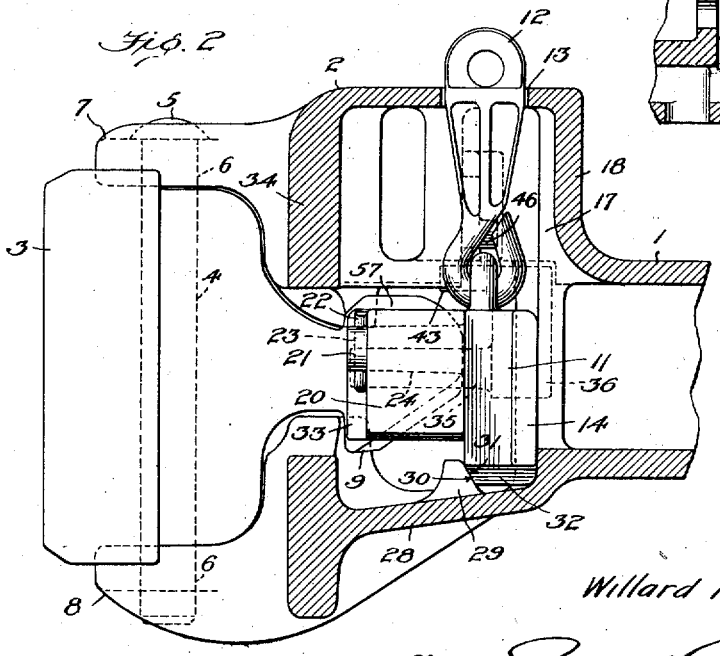
Inventor
Willard F Richards
By Louis A. Mueller
Attorney W. F. RICHARDS
June 3, 1930. COUPLER Re. 17,690
4 Sheets-Sheet 2
Original Filed Feb. 2, 1927
Fig. 3
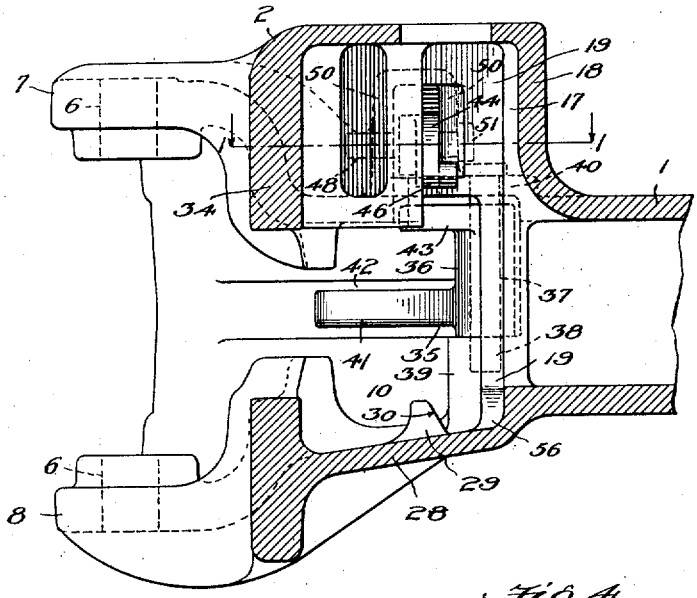
Fig. 4
Fig. 5
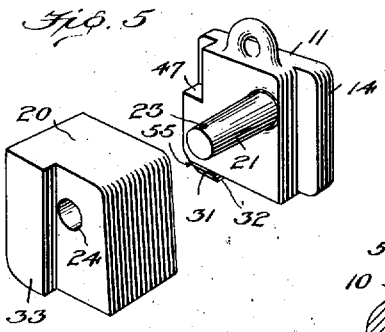
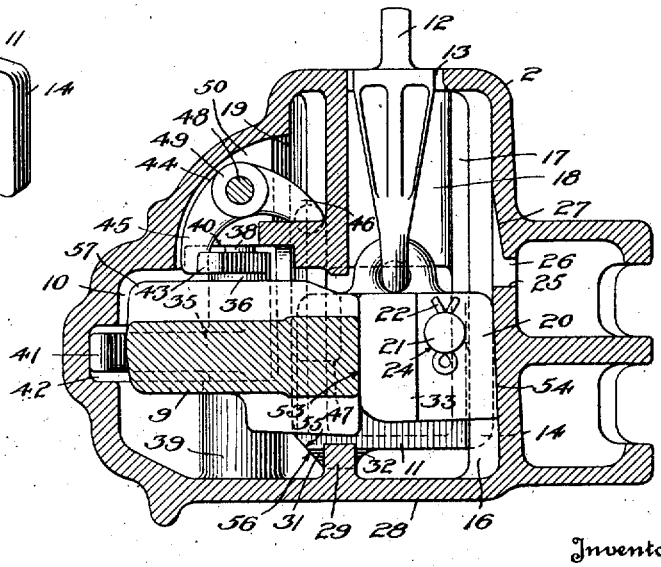
Inventor
Willard F. Richards
By
Attorney June 3, 1930. W. F. RICHARDS Re. 17,690

COUPLER

Original Filed Feb. 2, 1927 4 Sheets-Sheet 3

Inventor
Willard F. Richards

By Louis A. Mueller
Attorney

June 3, 1930.

W. F. RICHARDS

COUPLER

Re. 17,690

Original Filed Feb. 2, 1927

1 Sheets-Sheet 4

Inventor

Willard F Richards

By

Attorney

Reissued June 3, 1930 Re. 17,690

UNITED STATES PATENT OFFICE

WILLARD F. RICHARDS, OF DEPEW, NEW YORK, ASSIGNOR TO THE GOULD COUPLER COMPANY, OF NEW YORK, N. Y., A CORPORATION OF MARYLAND

COUPLER

Original No. 1,703,598, dated February 26, 1929, Serial No. 165,329, filed February 2, 1927. Application for reissue filed July 13, 1929. Serial No. 378,189.

This invention relates to couplers and, more particularly, to an improved car coupler adapted to interchange with the standard D coupler.

The principal object of my invention, generally considered, is the provision of a car coupler provided with improved locking means and knuckle opening mechanism.

An object of my invention is the provision of a car coupler provided with a knuckle opener which is vertically pivoted and operated from the locking mechanism through a pivoted bell crank lever, whereby said opener operates easier and under all conditions.

Another object of my invention is the provision of a car coupler in which the parts are simple in contour and adapted to be readily constructed and placed in position in the associated coupler head.

A further object of my invention is the provision of a coupler provided with an improved locking mechanism involving a guide block and a locking block pivotally connected together preferably by an integral forwardly extending tapered stud on the guide block passing through the locking block, said locking block being eccentrically mounted on said stud, where it is adapted to swing sideways to a ledge formed on the corresponding wall of the coupler head for holding said block in lock-set position.

A still further object of my invention is the provision of a coupler with improved locking mechanism involving a guide block mounted in a pocket in the associated coupler head, said pocket being formed with guiding ribs or flanges on side walls thereof and with a lug on the bottom wall for engaging a corresponding downward extension on the guide for limiting movement of the same.

An additional object of my invention is the provision of a car coupler involving improved knuckle opening mechanism, said mechanism preferably comprising a vertically pivoted knuckle opener with a lever extending into engagement with the tail of the knuckle for opening the same, said opener also involving a hub integrally connecting said lever to an arm thereabove and a bell crank lever mounted on a horizontal pivot pin above said arm and formed with one of its ends engaging the arm on the opener and the other engaged by the lock guide of the coupler whereby, when said guide is raised, the bell crank lever is actuated to move, in its turn, the knuckle opener, the horizontal pivot pin of the bell crank lever being formed with a head normally overlying the head of the corresponding pivot pin of the knuckle opener for holding said latter pin in place, said bell crank lever pin being prevented from undesired removal by providing prongs on the end thereof and expanding said prongs after insertion.

A further object of my invention is the provision of an improved car coupler involving a lock block which is wider at its lower portion and the adjacent wall of the head is correspondingly inclined whereby creeping of the lock is prevented, said lock being eccentrically mounted so that it tends to swing to a lock-set position into engagement with a ledge in the wall of the head, the tail of the knuckle being formed with a raised portion for unseating said locking block from lock-set position during inward and outward movement of the knuckle.

Other objects and advantages of the invention relating to the particular arrangement and construction of the various parts will become apparent as the description proceeds.

Referring to the drawings illustrating my invention, the scope whereof is defined by the appended claims:

Figure 1 is a plan of one embodiment of my improved form of coupler, shown partly in section on the line 1—1 of Figure 3, the parts being shown with the knuckle in locked or closed position.

Figure 1[a] is a sectional fragmentary view corresponding to a portion of Figure 1 with the bell crank lever and pivot pin therefor removed.

Figure 2 is a longitudinal sectional view on the line 2—2 of Figure 1 looking in the direction of the arrows.

Figure 3 is a sectional view corresponding to Figure 2 with the knuckle and locking mechanism removed.

Figure 4 is a transverse vertical sectional view on the line 4—4 of Figure 1 looking in the direction of the arrows.

Figure 5 is a detailed view of the locking block and guide block showing the manner of pivotally connecting the same.

Figure 6:
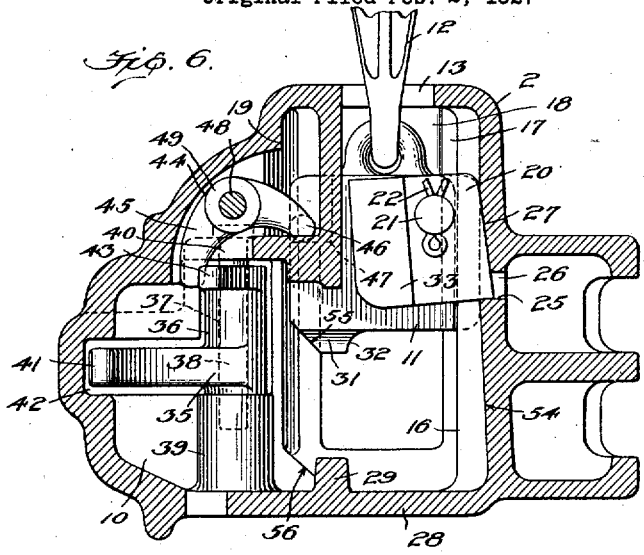
Figure 6 is a sectional view corresponding to Figure 4 but showing the lock block raised to lock-set position, and the knuckle removed.

Referring to the drawings in detail, like parts being designated by like reference characters, and first considering the embodiment of my invention illustrated in Figures 1 to 6, inclusive, I have shown a coupler 1, particularly adapted for railway cars, said coupler comprising a head 2 and a knuckle 3, said knuckle, in the present embodiment, being such as is used in a standard D coupler. The knuckle 3 is formed with a normally vertical aperture 4 receiving a pivot pin or pintle 5, which may be of standard construction, extending through registering apertures 6 in hinging ears 7 and 8 of the head. The knuckle is provided with a tail 9 which is received in a pocket 10 in the coupler head 2.

The locking mechanism for the knuckle 3, in the present embodiment, comprises a lock guide or guide block 11 which is operated upwardly and downwardly through a lifting link 12 connected thereto through the interengaging eyes shown and adapted for connection with an uncoupling device of any usual or desired character. The upper portion of the link 12 passes through an opening 13 in the top wall of the coupler head 2. The locking guide 11 is restrained in its approximately vertical movement by the provision of a flange or rib 14 along the side thereof preferably adjacent the guard arm side of the head. The rib or flange 14 preferably fits in a groove 15 in the corresponding wall of the head, said groove being, in the present embodiment, formed by a rib or flange 16 provided along the guard arm side wall of the lock cavity in the head forwardly of the rib 14. For guiding the block 11 along the rear surface thereof, a plurality of ribs 17 are preferably formed on the rear wall 18 of the head for accurately guiding said block upwardly and downwardly. The block is correspondingly guided on the knuckle side of the head by the corresponding wall 19 of the lock cavity, although, as will be more fully explained hereinafter, said guide is normally urged toward the guard arm side of the cavity.

Pivotally connected to the guide block 11 is the lock block 20, the means for connection, in the present embodiment, comprising an integral stud 21 extending forwardly from the front face of the lock guide 11 through the lock block 20 and prevented from undesired separation therefrom by a cotter 22 extending through a corresponding aperture 23 adjacent the end of said stud. The stud or integral pintle 21 is preferably tapered forwardly to facilitate casting of the parts and improve the accuracy of pivoting between the members. The corresponding aperture 24 in the lock block 20 is, of course, formed of a size and shape to correspond with that of the pintle 21. The lock block 20, as illustrated most clearly in Figures 4 and 6, is eccentrically mounted so that it tends to swing toward the guard arm side of the head 2. When raised through the uncoupling mechanism to the position illustrated in Figure 6, it takes a lock-set position by swinging counter-clockwise until the lower right-hand corner thereof engages on the shoulder or ledge 25 on the guard arm wall of the lock cavity. That portion of the guard arm of the lock cavity, above the shoulder or ledge 25, is preferably omitted for a short distance as indicated at 26 and then tapered or formed with a sloping inner surface 27 to correspond with the slope of the adjacent side wall of the lock block 20 when in lock-set position, as shown most clearly in Figure 6.

In addition to the side flanges or ribs on the lock cavity for guiding the lock guide 11, the lower wall or floor 28 of said cavity is preferably formed with an upstanding lug 29 positioned forwardly of the guide block 11 with its rear surface 30 bevelled or sloped to correspond with the engaging front surface 31 of a longitudinal extension 32 on the lower portion of said lock guide. The function of this engagement between the lug 29 and extension 32 on the lock guide is to hold said guide from forward movement, particularly when two couplers come together with both knuckles closed in their locked positions as frequently occurs in switching service. The lock block 20 pivotally associated therewith is preferably formed with a forward extension 33 on the knuckle side thereof, the front face of said extension preferably being flush with the end of the stud 21, whereby said stud is shielded from injury and the forward portion of the lock block presents a more nearly flat surface to the front wall 34 of the lock cavity. An additional function performed by the extension 33 is to assist in overbalancing the lock block and urge the same toward lock-set position.

For opening the knuckle 3, I have provided a knuckle opener 35, said opener, in the present embodiment, involving a bell crank lever with a hub portion 36 formed with a normally vertical opening 37 therethrough receiving a pivot pin or pintle 38 extending between a correspondingly apertured hub 39 rising from the bottom wall 28 of the head and a flange or web 40 overlying the top of the hub portion 39. From the lower portion of the hub 36, a knuckle opening arm, lever or kicker 41 extends and is received, when not in active position, in a corresponding groove 42 in the adjacent wall of the head 2. It will be appreciated that, as distinguished from preceding forms of couplers, the opener 35 is vertically pivoted and, on account of having its axis substantially parallel with that of the knuckle, it is in a position to more efficiently open the same by engaging the adjacent portion of the knuckle tail 9 with the curved arm or lever 41.

On account of the arm 41 being curved to correspond with the knuckle side of the head and the engaged portion of the tail of the knuckle, it will be apparent that the mechanical advantage of the arrangement for opening the knuckle is a maximum initially and decreases slightly as the knuckle is opened, on account of the point of engagement between the arm 41 and the tail of the knuckle advancing from the pivotal axis of the hub 36 toward the pivotal axis of the knuckle 3, as will be understood from a consideration of Figure 1 particularly. This construction, therefore, makes it relatively easy to open the knuckle as compared with other types of couplers for, as is well known, the force required to start the knuckle is the greatest, not only on account of the friction of rest being greater than the friction of motion, but on account of the force necessary to overcome the inertia of the knuckle.

For imparting motion to the knuckle opener 35 and the kicker portion 41 thereof, the hub 36 is formed preferably adjacent the upper part thereof with an actuating arm or extension 43, said arm preferably extending horizontally but being angularly disposed with respect to the kicker arm 41 in general. For transmitting motion between the guide block 11 and the opener 35 and more particularly the arm 43 thereof, a bell crank lever or pivoted member 44 is provided, said member having angularly disposed arms 45 and 46, the former of which engages the arm 43 of the knuckle opener and the latter of which is operated from the locking mechanism. In the present embodiment the arm 46 fits into a recess 47 in the guide block 11 for actuation from said guide block upon the same being raised. The bell crank lever 44 is preferably pivotally mounted with respect to the head 2 by having a substantially horizontal pivot pin 48 extending through a central or hub portion 49 thereof and through corresponding registering apertures in the transversely extending walls 50 of the head disposed forwardly and rearwardly of said bell crank lever 44. In order to avoid the necessity of a cotter or other similar means for preventing undesired removal or loss of the pivot pin 48, the rearwardly disposed end thereof is headed as indicated at 51 and the forward end is desirably bifurcated providing prongs 52 which are spread apart after assembly of the parts. No cotter or other similar securing means is necessary for the pivot pin 38 because the head 51 of the pin 48 overlies the head of the pin 38 and prevents undesired removal or loss thereof.

Upon referring particularly to Figure 4, it will be seen that the tail of the knuckle 9, which is held in locked position by the lock block 20, presents a substantially vertical or upright face 53 thereto. In order to prevent creeping of the lock block, the same is preferably formed wider at the lower portion thereof and the wall of the lock cavity, at the guard arm side of the head, is correspondingly inclined as indicated at 54. In order to urge the guide block 11 toward the guard arm side of the head, whereby it is more accurately guided by the engagement between the flanges 14 and 16 and the lock block closely positioned against the guard arm wall 54, the surface of the extension 32, toward the knuckle side of the guard arm, is preferably bevelled or inclined as indicated at 55 and the floor portion 28 of the head 2 is provided with a correspondingly inclined upward extension 56.

In order to provide for the releasing of the lock block 20 from lock-set position, the tail of the knuckle 3 is preferably formed with a raised portion 57 which engages the lower portion of the lock block 20 upon either opening or closing movement of the knuckle and revolves the same clockwise about the stud 21, thereby permitting the same to drop to locked position. The reason for this will be apparent upon considering Figure 6 as the tilting upwardly of the lower left-hand corner of the lock block 20 withdraws the lower right-hand corner of said block from the ledge 25 at the guard arm side of the head.

Figure 7:
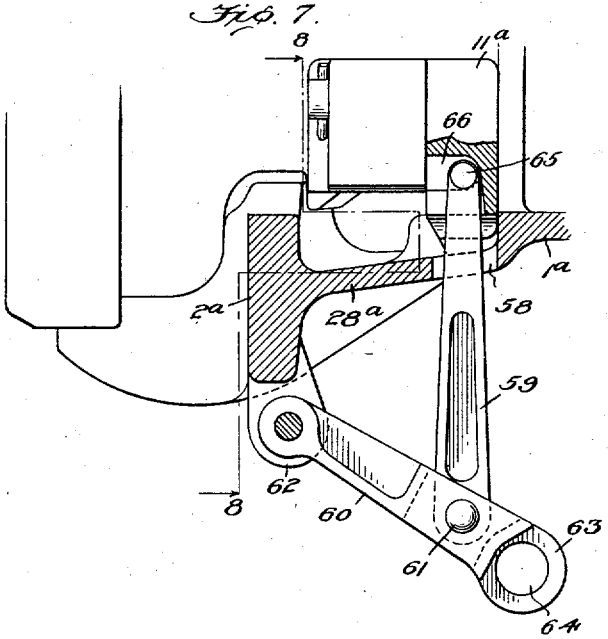
Figure 7 is a fragmentary sectional view corresponding to Figure 2 but showing an embodiment of my invention in which the lock is adapted for actuation from below instead of from above.
Figure 8:
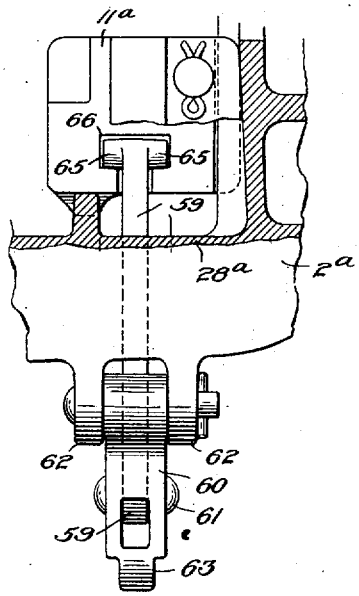
Figure 8 is a fragmentary sectional view on the line 8—8 of Figure 7 looking in the direction of the arrows.

Referring now to the embodiment of my invention illustrated in Figures 7 and 8, fragmentary portions of a coupler $1^a$ are there disclosed which may be substantially identical with the coupler 1 of the previous embodiment except that bottom operating mechanism is provided rather than top operating mechanism. For this purpose, the bottom wall or floor $28^a$ of the head $2^a$ is formed with an aperture 58 receiving a lock lifter 59 pivotally connected to the intermediate portion of a lifter lever 60 by means of a rivet or other pivot means 61. The forward portion of the lever 60 is shown pivoted with respect to a downward extension 62 from the bottom of the head 2[a]. The inner or lower end 63 of the lifter lever 60 is preferably apertured as indicated at 64 for connection with any usual or desired form of bottom operating uncoupling device. The upper end of the lock lifter 59 is preferably formed with transverse extensions or trunnions 65 which engage in a corresponding cavity 66 in the lock guide 11[a] for the purpose of raising and lowering the same as desired. Except as specifically described in connection with this embodiment, the construction and operation thereof may be identical with that of the first embodiment.

Figure 9:
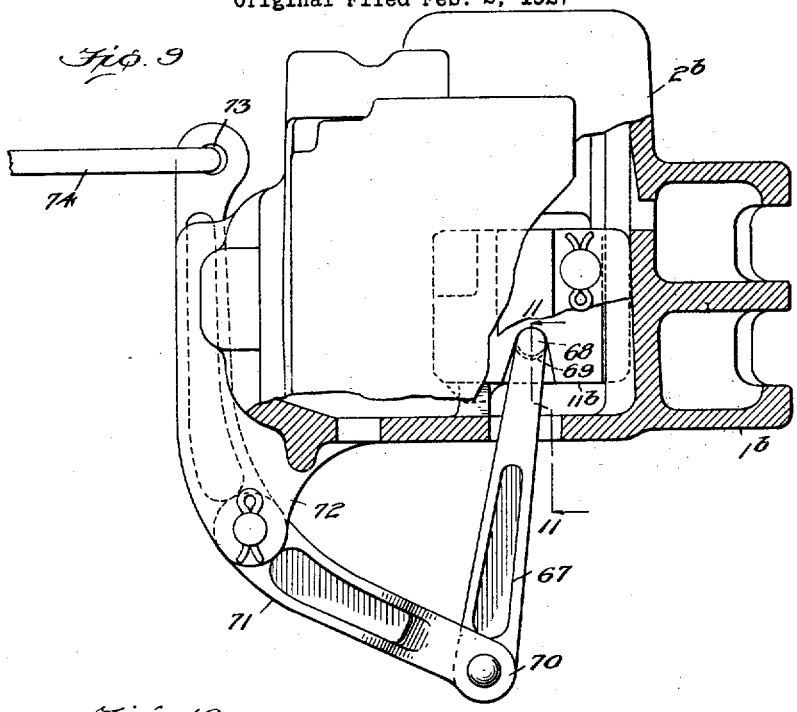
Figure 9 is a front elevational view, partly in section, illustrating a form of coupler embodying my invention but provided with mechanism for operating the same from the side rather than from the top or bottom of the coupler.
Figure 10:
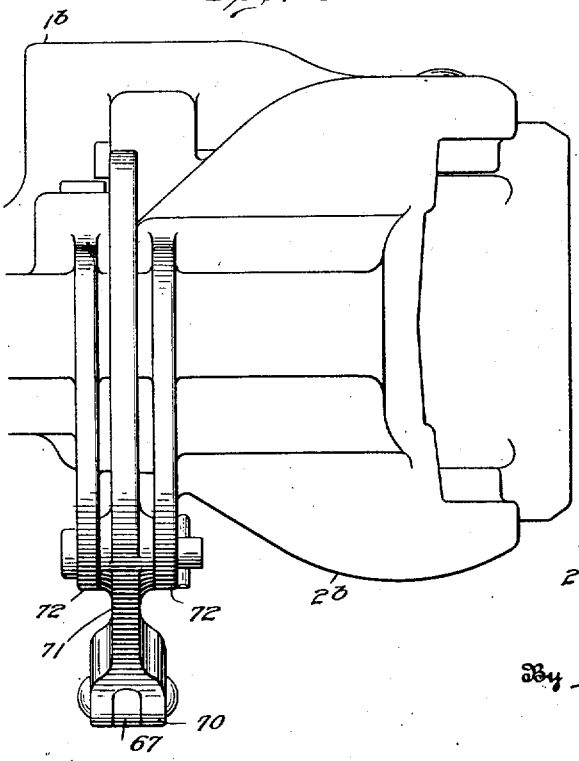
Figure 10 is an elevational view of the embodiment shown in Figure 9 looking from the left.
Figure 11:
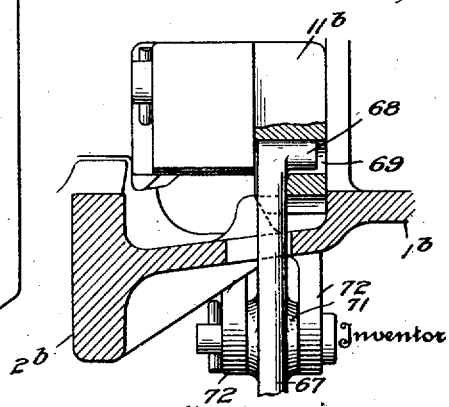
Figure 11 is a fragmentary sectional view on the line 11—11 of Figure 9 looking in the direction of the arrows.

Referring now to the embodiment of my invention illustrated in Figures 9 to 11, inclusive, a coupler 1[b] is there disclosed, which is adapted for operation from the side and, more particularly, from the knuckle side of the head 2[b]. For that purpose, a lock lifter 67 is provided, the upper end of which is preferably formed with a rearward extension or trunnion 68 engaging in a corresponding aperture 69 in the lower portion of the guide block 11[b]. The lower end of the lifter 67 is preferably pivoted to the lower end 70 of a preferably bent lever 71, the intermediate portion of which is pivoted to an extension 72 from the lower portion of the head at the knuckle side thereof and the upper end of said lever is preferably formed with an aperture 73 receiving any usual or desired form of uncoupling device 74 adapted for operation from the side of the associated car. Except as specifically described in connection with the present embodiment, the construction and operation of the coupler may correspond with that of the first embodiment.

It is thought that the operation of the aforedescribed coupler will be obvious to those skilled in the art from the foregoing disclosure. However, it might be pointed out that the locked position of the knuckle is illustrated in Figures 1, 2 and 4, where the tail of the knuckle is closely engaged by the lock block 20 which is, in turn, urged against the inclined wall adjacent the guard arm side of the head and thereby prevented from undesired dislodgment under any strain to which the knuckle may be subjected. Upon raising the locking mechanism or guide block 11 by any means, that is, either the top, or bottom or side operating mechanism, the tail of the knuckle is first released and, if the lock guide and its connected lock block are held as indicated in Figure 6, the lock block will take a lock-set position where it is adapted to permit automatic operation or uncoupling in accordance with well understood principles.

With the locking block in lockset position the knuckle is free to move to open position under the influence of another knuckle as, for instance, on the parting of the train. Since the major portion of the projection 57 on the knuckle tail lies above the lower face of the locking block when the same is in lockset position, outward movement of the knuckle will raise the locking mechanism vertically in the head so that it will be supported upon the knuckle tail as long as the knuckle is in fully or partially opened position. Upon the return of the knuckle to locked position the drag of the projection 57 of the knuckle tail on the lower face of the locking block will cause the same to assume an upright position and the entire locking mechanism is lowered as the inclined portion of the projection 57 passes beneath the block 20, so that the lower edge of said block is below the lockset seat 25 thus permitting the entire mechanism to drop to locked position as soon as the knuckle tail clears the adjacent edge of the locking block.

Upon raising the lock guide and its connected lock block above the position indicated in Figure 6, the bell crank lever 44 is rotated counter-clockwise due to engagement between the arm 46 thereof and the ledge 47 on the lock guide. The other arm 45 of said bell crank lever, in turn, engages the upper arm 43 of the knuckle opener causing the lower arm or kicker portion 41 thereof to rotate counter-clockwise, as viewed in Figure 1, and to push the tail of the knuckle 3 outwardly from the head, rotating the same clockwise about its pivot pin 5. At the beginning of the opening movement of the knuckle, the effective length of the kicker arm 41 is at a minimum while the corresponding arm of the knuckle tail is at a maximum, so that a maximum starting force is secured, the effective arm of the kicker 41 slightly increasing by rolling on the engaged surface of the knuckle tail as the knuckle is opened, resulting in a slight decrease in available force after the knuckle starts to open.

By virtue of the foregoing disclosure, it will be apparent that I have devised an improved form of coupler which, although involving an additional element between the lock guide and knuckle opener, provides for easier operation thereof and for operation under all conditions. Another desirable result secured by the foregoing construction is that the locking arrangement is more secure, the parts simple and adapted to be substantially constructed and easily placed in their respective positions in the coupler head. The operation of assembling the parts of the coupler mechanism in the coupler head is thought to be too simple to require a detailed disclosure of the manner of assembly. It should be noted that the coupler heretofore described not only interchanges with the standard D coupler but is one in which the D knuckle can be used.

Having now described my invention, I claim:

1. In combination, a coupler head, a swinging knuckle, a locking device for the knuckle comprising a guide block, a pintle extending forwardly from the front face thereof, a locking block pivoted on said pintle and means actuated by said guide block for opening said knuckle.

2. In combination, a coupler head, a swinging knuckle, a locking device for the knuckle comprising a guide block, an integral pintle extending therefrom, a locking block swinging on said pintle and means directly engageable by the guide block for opening said knuckle.

3. In combination, a coupler head, a swinging knuckle, a locking device for said knuckle comprising a guide block, a tapered stud extending forwardly therefrom, a locking block pivoted eccentrically on said stud so as to swing toward a side wall of said head, said wall being provided with a ledge on which said locking block is adapted to rest in lock-set position and means engageable by the guide block on upward movement thereof for opening said knuckle.

4. In combination, a coupler head, a swinging knuckle, a locking device for the knuckle comprising a guide block, a pintle extending forwardly therefrom, a locking block pivoted on said pintle, said guide block being formed with a flange on the guard arm side thereof, the adjacent wall of said head being formed with a groove into which said flange fits for restraining movement of said guide block, and means actuated by said guide block for opening said knuckle.

5. In combination, a coupler head, said head being formed with a pocket for receiving a knuckle and locking device therefor, the wall of said pocket, adjacent the guard arm side of said head, being formed with a substantially upright rib providing a groove, a knuckle pivotally connected to said head, a locking device for said knuckle comprising a guide block, said guide block having a flange thereon fitting in the groove formed in the head for guiding the same during upward and downward movement thereof, pivotal means extending from said guide block, a locking block mounted thereon, and knuckle opening means actuated by said guide block.

6. In combination, a coupler head formed with a pocket for receiving locking means, a swinging knuckle, a locking device for the knuckle comprising a guide block, the rear surface of said guide block engaging the rear wall of the pocket in the head, said rear wall being formed with upright ribs disposed therealong for guiding said guide block during upward and downward movement thereof, pivotal means extending from said guide block, a locking block mounted thereon, and means actuated by said guide block for opening said knuckle.

7. In combination, a coupler head, said head being formed with a pocket for receiving locking means, a swinging knuckle, a locking device for said knuckle comprising a guide block, the walls of said pocket, adjacent said guide block, being formed with guiding ribs thereon whereby said block is guided between one of said walls and a rib on said opposite wall and by ribs on the connecting wall therebetween, a pintle extending forwardly from said guide block, a locking block pivoted thereon and adapted, when in lowered position, to lock the knuckle and, when in raised position, to release said knuckle, and means for raising and lowering said guide block and connected locking block.

8. In combination, a coupler head, a swinging knuckle, a locking device for said knuckle comprising a guide block and a locking block pivotally connected thereto, a vertically pivoted lever and means actuating said lever from said guide block for opening said knuckle.

9. In combination, a coupler head, a swinging knuckle, a locking device for the knuckle comprising a guide block, a knuckle opener comprising a hub formed with a normally vertical aperture therethrough, means extending through said aperture for pivotally mounting said opener, a lever extending from said hub for operating said knuckle and an actuating portion extending from said hub above said lever for operating said lever through the movement of the guide block.

10. In combination, a coupler head, a locking device, a swinging knuckle having a tail extending into said head, a knuckle opener comprising a vertically pivoted hub with a lever extending therefrom into engagement with the tail of the knuckle, an actuating lever extending from said hub above said knuckle opener lever and means pivoted to the head and extending from said actuating lever to said device for transmitting motion therefrom to open the knuckle.

11. In combination, a coupler head, a swinging knuckle, a locking device for the knuckle comprising a guide block, a bell crank lever pivoted in said head and engaged by said guide block on upward movement thereof and a device pivoted in said head and actuated by said bell crank lever to open said knuckle.

12. In combination, a coupler head, a swinging knuckle, a locking device for the knuckle comprising a guide block, a longitudinal extension on the bottom of said guide block, a lug formed on the bottom of the pocket, adjacent said extension, to hold said guide block from forward movement, a locking block pivotally mounted with respect to said guide block and means actuated by said guide block for opening said knuckle.

13. In combination, a coupler head, a swinging knuckle, a locking device for said knuckle comprising a guide block, a locking block pivotally mounted with respect to said guide block and flared downwardly, the corresponding wall of the head being inclined to engage said locking block and prevent creeping thereof, and means actuated by said guide block for operating said knuckle.

14. In combination, a coupler head, a knuckle pivotally mounted with respect thereto and having a tail extending into said head, a locking device for said knuckle comprising a guide block, a stud extending forwardly from the front face of said block, a locking block pivoted on said stud eccentrically with respect to said guide block so as to swing toward a side wall of said head, said wall being provided with a ledge on which said locking block rests in lock-set position, the tail of said knuckle being formed with a raised portion which engages said locking block during inward and outward movement of the knuckle to unseat said block from the ledge.

15. In combination, a coupler head, a knuckle pivoted with respect to said head and formed with a tail extending therein, a locking device for the knuckle comprising a guide block, a knuckle opener comprising a hub formed with a normally vertical aperture therethrough, a pivot pin extending through said aperture and adjacent portions of the head for pivotally mounting said opener, a lever extending from said hub for operating said knuckle, an arm extending from said hub above said lever, another lever provided with a plurality of angularly disposed arms positioned above said hub with one of its arms adapted to engage the arm of the knuckle opener and the other of its arms adapted to be engaged by the guide block for operating said opener, pivotal means extending through said last mentioned lever for mounting the same in the head, said pivotal means comprising a pin formed with a head overlying the head of the pivotal means for the knuckle opener for holding the same in place.

16. In combination, a coupler head, a locking device, a pivoted knuckle having a tail extending into said head, a knuckle opener comprising a hub pivoted about a normally vertical axis with an arm extending therefrom for engagement with the tail of the knuckle, an actuating arm extending from said hub above said knuckle opener arm, and means pivoted to the head and interposed between said actuating arm and said locking device for transmitting motion therefrom to open the knuckle.

17. In combination, a coupler head, a swinging knuckle, a locking device for the knuckle, a bell crank lever pivoted in said head and adaptd to be operated by said locking device upon upward movement thereof, and a device pivoted in said head and actuated by said bell crank lever to open said knuckle.

18. In combination, a coupler head, a knuckle pivoted to said head and formed with a tail extending therein, a locking device for said knuckle, a knuckle opener comprising a hub with a normally vertical aperture therethrough, pivotal means extending through said aperture and the adjacent portions of said head for mounting said opener, an arm extending from said hub and adapted to engage the tail of said knuckle, another arm extending from the hub above said arm, a lever pivotally mounted within said head and formed with a plurality of angularly disposed arms positioned above said hub with one of its arms adapted to engage an arm of said knuckle opener, and the other adapted to be actuated through engagement of the locking device.

19. In combination, a coupler head, a knuckle pivoted to said head and formed with a tail extending therein, a locking device for said knuckle, a knuckle opener comprising a hub with a normally vertical aperture therethrough, pivotal means extending through said aperture and the adjacent portions of said head for mounting said opener, an arm extending from said hub and adapted to engage the tail of said knuckle, another arm extending from the hub above said knuckle tail, a lever formed with a plurality of angularly disposed arms positioned above said hub with one of its arms adapted to engage the arms of said knuckle opener, and the other adapted to be engaged by the locking device for operating said opener, pivotal means extending through said last mentioned lever for mounting the same in the head, the pivotal means having portions thereof in overlapping relation, whereby one of said pivotal means serves to maintain the other in operative position.

20. In combination, a coupler head, a locking device adapted for vertical movement, a swinging knuckle having a tail received in said head, a knuckle opener comprising a bell crank lever, one arm of which is adapted to engage the tail of the knuckle, a second bell crank lever with an arm adapted to engage the other arm of said opener, the other arm of said second bell crank lever being disposed above said locking device for engagement and actuation thereby upon movement thereof beyond a predetermined position.

21. In combination, a coupler head, a locking device, a pivoted knuckle having a tail received in said head, and knuckle opening mechanism comprising a pair of bell crank levers, one pivoted about a normally vertical axis and adapted to directly engage the tail of the knuckle, the other pivoted about a normally horizontal axis and adapted to actuate the other bell crank lever and be actuated by the locking device after a predetermined movement thereof.

22. In combination, a coupler head, a vertically movable locking device guided in said head, a knuckle having a tail received in said head, and knuckle opening mechanism operatively interposed between said locking device and the tail of the knuckle, said mechanism comprising a pair of cooperating pivotally mounted bell crank levers.

23. In a coupler head, the combination with the standard D knuckle, of a vertically movable locking device for holding said knuckle in closed position, and means for forcing said knuckle to open position upon movement of said locking device, said means including a pair of interengaging bell crank levers, an arm of one of said levers engaging said knuckle, an arm of said other lever being adapted to be actuated by said locking device, the said arm of the first named lever being shaped to conform with the extreme inner face of the knuckle tail, whereby initially the maximum force is applied to open the same.

In testimony whereof I affix my signature.

WILLARD F. RICHARDS.